(12) United States Patent
Yang et al.

(10) Patent No.: US 12,461,154 B2
(45) Date of Patent: Nov. 4, 2025

(54) INSPECTION APPARATUS FOR INSPECTING ELECTRICAL EQUIPMENT

(71) Applicant: Taiwan Semiconductor Manufacturing Company, Ltd., Hsinchu (TW)

(72) Inventors: Chun Hung Yang, Tainan (TW); Ning Kang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 247 days.

(21) Appl. No.: 18/142,731

(22) Filed: May 3, 2023

(65) Prior Publication Data

US 2024/0369633 A1 Nov. 7, 2024

(51) Int. Cl.
*G06F 3/0488* (2022.01)
*G01R 31/327* (2006.01)
*G06F 3/04845* (2022.01)

(52) U.S. Cl.
CPC ...... *G01R 31/3277* (2013.01); *G06F 3/04845* (2013.01); *G06F 3/0488* (2013.01); *G06F 2203/04806* (2013.01)

(58) Field of Classification Search
CPC ............. G01R 31/3277; G06F 3/04845; G06F 3/0488; G06F 2203/04806
See application file for complete search history.

(56) References Cited

U.S. PATENT DOCUMENTS

| | | | |
|---|---|---|---|
| 2013/0335549 A1 | 12/2013 | Hatcher, Jr. et al. | |
| 2015/0358560 A1* | 12/2015 | Boulanger | G06T 5/50 348/164 |
| 2022/0007925 A1* | 1/2022 | Stith | A61B 1/0638 |
| 2024/0090770 A1* | 3/2024 | Hancock | G01N 21/65 |
| 2024/0137625 A1* | 4/2024 | Kim | H04N 5/33 |

FOREIGN PATENT DOCUMENTS

| | | |
|---|---|---|
| TW | 202101961 A | 1/2021 |
| WO | 2019057469 A1 | 3/2019 |

OTHER PUBLICATIONS

Taiwan Office Action for Application No. 11321023450 Dated: Oct. 11, 2024.

* cited by examiner

*Primary Examiner* — Thai Q Tran
*Assistant Examiner* — Jose M Mesa
(74) *Attorney, Agent, or Firm* — Lippes Mathias LLP (57) ABSTRACT

An inspection apparatus for performing electrical equipment inspection includes a rod, a probe attached to an end of the rod, an infrared imaging sensor disposed on the probe, at least one visible light source disposed on the probe, and a visible light imaging sensor disposed on the probe. Infrared imaging data acquired by the infrared imaging sensor are transmitted to a proximal portion of the rod, and visible light imaging data acquired by the visible light imaging sensor are transmitted to the proximal portion of the rod. The at least one visible light source may comprise a green light source, and the visible light imaging data is in this case green light imaging data. The infrared image or video is used to detect thermal hot spots, and the green light image or video is used to detect metal whiskers or the like.

20 Claims, 8 Drawing Sheets

INSPECTION APPARATUS FOR INSPECTING ELECTRICAL EQUIPMENT

BACKGROUND

The following relates to the electronic equipment inspection arts, electronic equipment failure detection arts, and related arts.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A semiconductor fabrication facility contains a large amount of electrical equipment, including semiconductor processing tools and power delivery electrical equipment such as low-voltage switchgear (LV SWG) panels. A well-maintained routine of scheduled inspection of the large inventory of electrical equipment advantageously can detect incipient issues and enable timely equipment maintenance or replacement to reduce likelihood of unexpected interruption of the semiconductor processing workflow due to electrical equipment malfunction.

There are a number of failure modes by which electrical equipment can fail. In the case of electrical equipment carrying high voltages and/or high electrical current levels, some failure modes relate to fatigue or degradation of the electrical conductors or electrical connections. Such failure modes may be detectable as thermal hot spots generated by elevated electrical resistance at the fatigued or degraded electrical conductor, or elevated galvanic resistance of a degraded electrical connection.

Another possible failure mode is the formation of a tin whisker or whiskers. This failure mode can occur in the case of tin-coated copper or copper alloy bars of LV SWG panels or similar electrical equipment having tin-coated copper or copper alloy conductors. The tin coating serves as a protective coating. The mechanism of tin whisker formation is not fully understood, but is believed to be due to crystalline metallurgical tin migration growth driven by electric fields on the copper or copper alloy conductor. More generally, metal whisker formation (of which tin whisker formation is one example) has been observed in the case of various metal coatings such as tin, zinc, and lead. Tin whiskers can grow to lengths in excess of a one centimeter or longer. In the close confines of tightly packed electrical components and closely spaced electrical conductors common in commercial electrical equipment such as LV SWG panels, tin whiskers can easily produce electrical shunting or shorting and consequent degradation of failure of the subject electrical equipment. While metal whiskers can be relatively long, on the order of a centimeter or more, they are typically very thin, being metallic hairs or whiskers. Tin whiskers, for example, can be on the order of 1-5 microns in diameter, and zinc whiskers are also on the order of a few microns in diameter. The metal whiskers are also usually made of the same metal as the coating (e.g., tin whiskers forming on a tin-coated copper or copper alloy conductor), so that they can blend into the background on visual inspection. Hence, in spite of their substantial length, metal whiskers can easily escape detection during visual inspection of electrical equipment.

The tight confines within the housings of typical commercial electrical equipment further increase the difficulty in detecting hot spots, metal whiskers, or other manifestations of incipient equipment failure modes.

Disclosed herein are inspection apparatus and corresponding inspection methods which beneficially increase the visibility and likelihood of detection of failure modes such as hot spots and metal whiskers. In some illustrative embodiments, the inspection apparatus includes an endoscope with both infrared and visible light imaging sensors, and a visible light source for providing illumination for the inspection using the visible light imaging sensor. In some embodiments, the visible light source is a green light source, as it is recognized herein that green light is especially effective for detecting metal whiskers. This is due to several factors, including strong scattering of green light by metallic features such as metal whiskers, and high sensitivity of the human eye to green light. In a further aspect, in some embodiments the infrared and visible light imaging sensors (and hence the corresponding acquired infrared and visible light images) have significantly different spatial resolutions, with the visible light imaging sensor being higher resolution than the infrared imaging sensor. Making the infrared imaging sensor of lower resolution advantageously enables the infrared sensor to be a smaller and lower-cost component-yet, as recognized herein performance of the inspection apparatus is not degraded because the infrared imaging sensor is mainly used to detect thermal hot spots which are relatively large (especially compared with the micron-sized diameter of metal whiskers).

Figure 1:
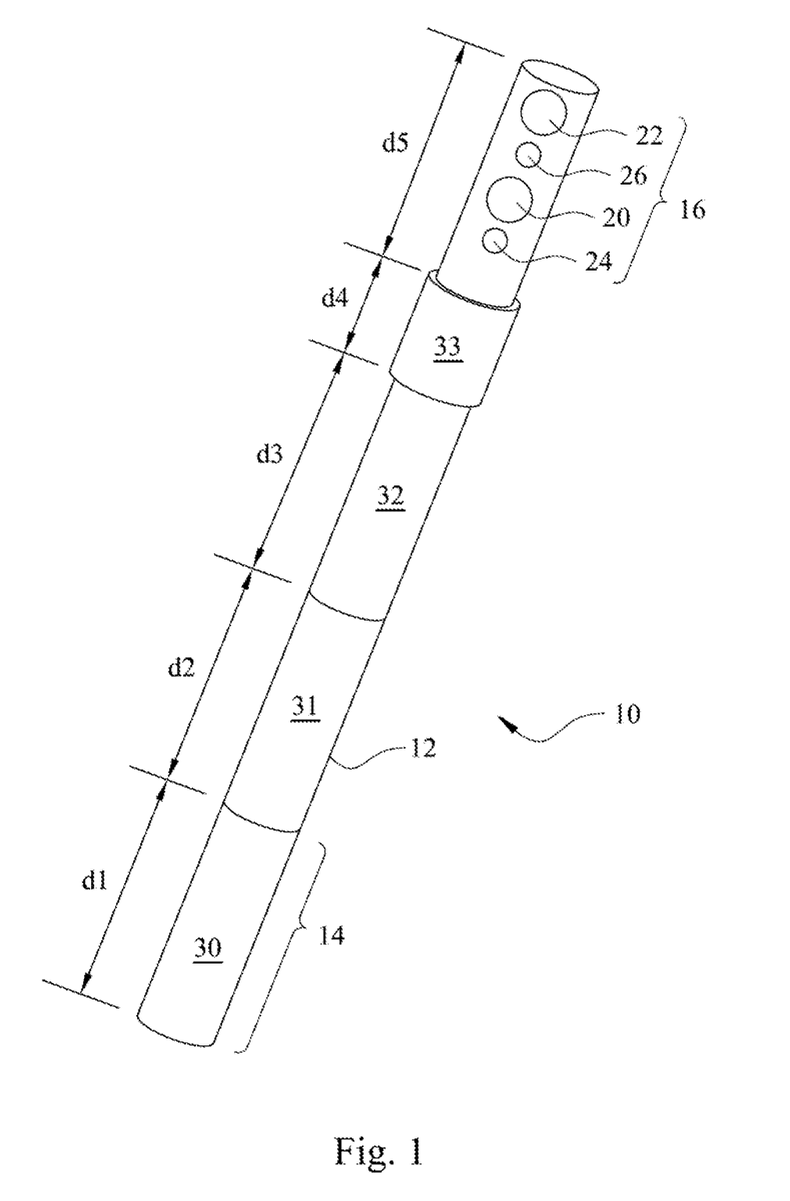
FIG. 1 diagrammatically illustrates an endoscope for inspecting electrical equipment.

With reference now to FIG. 1, an endoscope 10 for performing inspection of electrical equipment is shown. The endoscope 10 includes a rod 12 having a proximal section 14 and a probe 16 at the opposite distal end of the rod 12 from the proximal section. During inspection of electrical equipment, the rod 12 is inserted into a housing, case, or other enclosure of the electrical equipment to position the probe 16 to view the electrical equipment being inspected. The rod may be inserted through a door or other opening of the enclosure. The proximal section 14 of the rod 12 typically remains outside of the housing, although if the enclosure is sufficiently large the entire rod 12 might be held within the enclosure. The probe 16 of the rod 12 includes an infrared imaging sensor 20, a visible light imaging sensor 22, and at least one visible light source 24 and 26. In the illustrative example, the at least one visible light source includes a white light source 24 and a green light source 26. As disclosed herein, the green light source 26 can be particularly useful for providing illumination for detecting metal whiskers, accumulation of fine dust particles, and other fine features that could lead to degradation or failure of the electrical equipment undergoing inspection.

Figure 2:
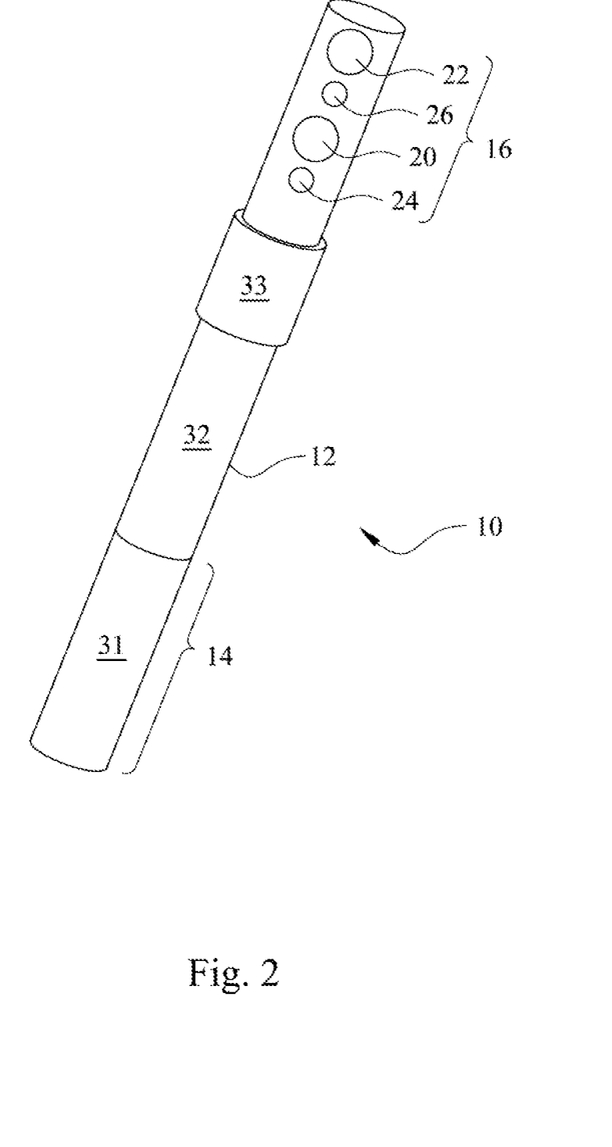
FIG. 2 diagrammatically illustrates an endoscope with a reduced assembled length compared with the endoscope of FIG. 1.
Figure 3:
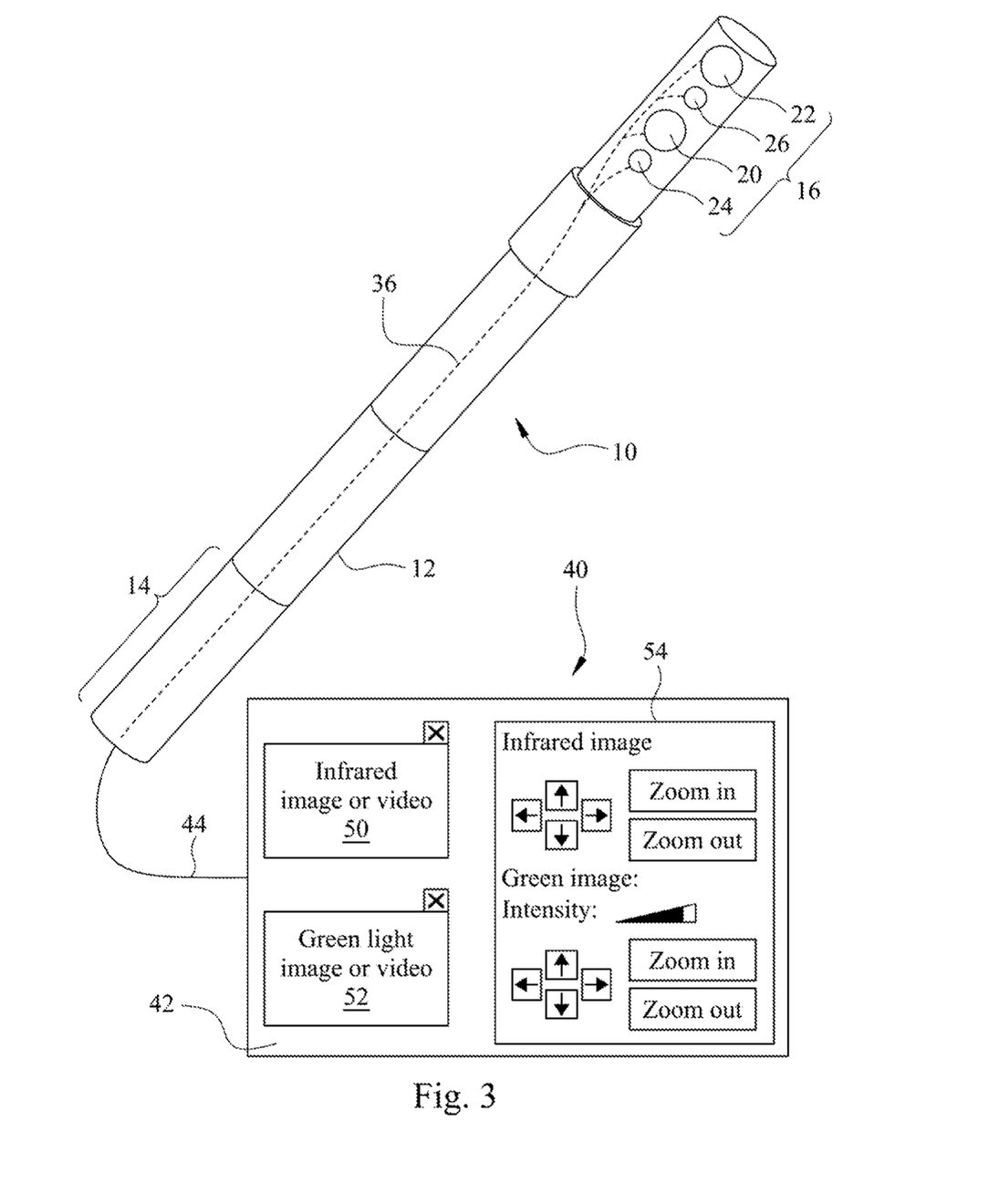
FIG. 3 diagrammatically illustrates an inspection system including the endoscope of FIG. 1 and an electronic controller with a display.

With continuing reference to FIG. 1 and with further reference to FIG. 2, the rod 12 can be a straight rigid rod, for example a hollow plastic rod. In the examples of FIGS. 1-3, the rod 12 is modular, comprising multiple sections that are detachably secured together. The rod sections are indicated in FIG. 1 as section 30, section 31, and section 32. A connector 33 attaches the probe 16 to the distal end of the rod 12. In the assembled rod 12 shown in FIG. 1, the sections 30 and 31 are detachably connected together, the sections 31 and 32 are detachably connected together, and the probe 16 is attached with the section 32 at the distal end of the rod 12 by the connector 33. In the rod 12 as assembled in FIG. 1, the section 30 corresponds to the proximal portion 14 of the rod 12. Advantageously, the rod 12 can be shortened by detaching and removing one or more of these sections. This is illustrated in FIG. 2, where the rod 12 is an assembly similar to that of FIG. 1 but in which the section 30 is omitted (e.g., removed), so that the rod 12 of FIG. 2 includes only the sections 31 and 32 secured together, with the probe 16 again secured to the section 32 by the connector 33. In this shorter rod 12 of FIG. 2, the section 31 corresponds to the proximal portion 14 of the rod. This modularity of the illustrative rod 12 is optional (in other embodiments, the entire rod 12 may be a single-piece with no detachable sections), but modularity of the rod 12 has an advantage in enabling the length of the endoscope 10 to be chosen to be appropriate for the space and confines of given electrical equipment to be inspected. In one nonlimiting illustrative example, each of the three sections 30, 31, and 32 is each around 30-40 cm in length, the connector 33 is around 5-10 cm, and the probe 16 is around 30-40 cm in length. As a specific example, taking a fixed value of 35 cm for each of the sections 30, 31, and 32 and for the probe 16, and a length of 8 cm for the connector 33, the total length of the endoscope 10 can be chosen to be 4×35 cm+8 cm=148 cm for the example of FIG. 1, or 3×35 cm+8 cm=113 cm for the example of FIG. 2 (i.e., reduced in length by 35 cm compared with the example of FIG. 1 by removal of the section 30), and the endoscope 10 could be further shortened to 2×35 cm+8 cm=78 cm by further removing the section 31 (example not shown).

The illustrative rod 12 is a straight rod, and may for example be made of hollow tubular plastic sections 30, 31, 32, and a plastic section for the probe 16 with the imaging sensors 20 and 22 visible light sources 24 and 26 mounted thereon, and a plastic connector 33. The detachable connections between the sections may be implemented for example as threaded connections, or friction- or resistance-fit connections (e.g., with one section having a narrowed outer diameter at one end that fits into an inner diameter of the mating section to form the frictional fitting), or so forth. In another contemplated embodiment (not shown), the rod could be a hollow semi-flexible gooseneck tube that can be bent to form a curve but has enough rigidity to hold the curve.

With reference to FIG. 1 and further reference now to FIG. 3, electrical conductors 36 pass through the rod 12 from the probe 16 to the proximal portion 14 of the rod 12 opposite from the distal end at which the probe 16 is attached. The electrical conductors 36 may be embodied as wires, a cable bundle, or so forth. The electrical conductors 36 are typically disposed inside the rod 12, for example in a central lumen of the rod 12 if the rod 12 is a hollow tube. In the modular rod design of FIGS. 1 and 2, different lengths of cable, wiring, or other electrical conductors 36 could be provided so that the length of the electrical conductors 36 can be chosen to match the length of the assembled rod 12, or the electrical conductors 36 could be of a single fixed length and is packed into the central lumen of the hollow rod 12. Alternatively, if the rod 12 is solid then the electrical leads 36 may be embedded in the solid rod—for example, the rod 12 could comprise a plastic cylinder that is formed by molding plastic around the electrical conductors 36. In the modular rod design of FIGS. 1-3, each section 30, 31, and 32 could have a corresponding embedded section of the electrical conductors 36 and the connections between the sections can have suitable electrical connectors between the sections that are connected together when the sections are connected together.

The electrical conductors 36 are connected to transmit infrared imaging data acquired by the infrared imaging sensor 20 to the proximal portion 14 of the rod 12 and to transmit visible light imaging data acquired by the visible light imaging sensor 22 to the proximal portion 14 of the rod 12. FIG. 3 shows an inspection system including the endoscope 10 of FIG. 1 and further including an electronic controller 40 with a display 42. The electronic controller 40 is operatively connected with the electrical conductors 36 at the proximal portion of the rod 12, for example by an electrical cable 44, to receive the infrared imaging data from the infrared imaging sensor 20 and the visible light imaging data from the visible light imaging sensor 22, respectively. The electronic controller 40 is configured to display, on the display 42, an infrared image or video 50 generated from the infrared imaging data and a visible light image or video 52 generated from the visible light imaging data. The electronic controller 40 additionally displays a user interface 54 providing the user with functionality such as zooming and panning of the infrared image or video 50 and zooming and panning of the visible light image or video 52. In the illustrative user interface 54, panning of the infrared ("IR") image or video 50 is provided by an illustrative cluster up/down/left/right arrows (e.g., pressing the up-button pans the infrared image or video 50 upward) and zooming is provided by an illustrative "zoom in" button to zoom the infrared image 50 in (effectively providing digital magnification of the infrared image 50) and an illustrative "zoom out" button to zoom the infrared image 50 out. Likewise, in the illustrative user interface 54, panning of the visible light image or video 52 is provided by an illustrative cluster up/down/left/right arrows and zooming is provided by illustrative "zoom in" and "zoom out" buttons. Additionally or alternatively, other types of touch-sensitive display user interactions can be used to perform such functionality. For example, a pinch-out gesture can be applied directly to the infrared image 50 to zoom in, and a pinch-together gesture can be applied directly to the infrared image 50 to zoom out, and likewise a pinch-out gesture can be applied directly to the visible light image 52 to zoom in and a pinch-together gesture can be applied directly to the visible light image 52 to zoom out. As yet another example, swipe gestures can be applied directly to an image 50 or 52 to pan the image. Other display manipulation functionality can be implemented: for example, if the infrared image or video comprises video then a corresponding "freeze" toggle (not shown) could be provided to enable the user to freeze the video on a single frame to enable inspection without the blurring produced by rapid frame-by-frame updating of the video (e.g., at 30 frames per second as a typical video frame rate). It will be appreciated that the foregoing and the illustration of the user interface 54 presented in FIG. 3 are merely nonlimiting examples of some suitable user interfacing mechanisms that can be provided for the user to manipulate the respective infrared and visible light images or video 50 and 52.

As previously noted, the infrared image or video 50 is generated from infrared imaging data acquired by the infrared imaging sensor 20, and the visible light image or video 52 is generated from visible light imaging data acquired by the visible light imaging sensor 22. The infrared imaging sensor 20 comprises a two-dimensional array of pixels in which each pixel is sensitive to, and capable of measuring an intensity of, infrared light impinging on the pixel. For example, the infrared imaging sensor 20 may comprise a CMOS imaging array, a CCD imaging array, or so forth. Likewise, the visible light imaging sensor 22 comprises a two-dimensional array of pixels in which each pixel is sensitive to, and capable of measuring an intensity of, visible light impinging on the pixel. For example, the visible light imaging sensor 22 may comprise a CMOS imaging array, a CCD imaging array, or so forth. The spatial resolution of the infrared imaging sensor 20 and of the acquired infrared image or video 50 may be measured in terms of the number of pixels in the two-dimensional array of pixels of the infrared imaging sensor 20. Likewise, the spatial resolution of the visible light imaging sensor 22 and of the acquired visible light image or video 52 may be measured in terms of a number of pixels in the two-dimensional array of pixels of the visible light imaging sensor 22.

In general, higher spatial resolution (corresponding to a higher number of pixels in the array of the imaging sensor) improves likelihood of detecting small features in the image or video, but also correlates with higher cost of the imaging sensor and also to a larger overall size of the imaging sensor in order to accommodate the higher number of pixels. As recognized herein, the optimal spatial resolution for the infrared imaging sensor 20 and corresponding infrared image or video 50 is different from the optimal spatial resolution for the visible light imaging sensor 22 and corresponding visible light image or video 52. The infrared image or video 50 is typically used to identify thermal hot spots in conductors, connections, or components of the electrical equipment undergoing inspection. Such thermal hot spots can indicate degradation and/or incipient failure of the electrical equipment. The thermal hot spots tend to appear as bright regions of the thermal image or video 52, since a hot spot emits a higher amount of infrared light (e.g., according to the Stefan-Boltzmann law, the total emitted radiant heat energy from a hot surface scales with the fourth power of its absolute temperature). Thermal hot spots tend to be relatively large, e.g. comparable with the size of the connection, conductor, or component that is running at an unacceptably high temperature. Hence, the spatial resolution of the infrared sensor 20 and of the corresponding infrared image or video 50 can be relatively low. For example, in some embodiments, the infrared imaging sensor 20 has a spatial resolution of one million pixels or lower. As one nonlimiting specific example, the infrared imaging sensor 20 may comprise a two-dimensional array of 120×160 pixels, so that the number of pixels is 120×160=19,200 pixels. Using a relatively small number of pixels in the infrared imaging sensor 20 (e.g., one million pixels or less in some embodiments) advantageously reduces the cost and complexity of the infrared imaging sensor 20 and can enable a reduced overall size for the infrared imaging sensor 20, without concomitant loss of functionality in detecting thermal hot spots while inspecting electrical equipment. While a smaller number of pixels in the infrared imaging sensor 20 can have such advantages, it is also contemplated for the infrared imaging sensor to have a higher number of pixels, e.g. greater than one million pixels.

Different considerations govern optimization of the visible light imaging sensor 22. The visible light image or video 52 is typically used to identify tin (or other metal) whiskers, dust particle accumulations, or the like. Such features can lead to electrical shunting or even electrical shorting, and consequent degradation or failure of the subject electrical equipment. For example, a tin whisker may originate on the tin-coated surface of one copper conductor or electrical connection; however, as it grows it extends further and further away from that source copper conductor or electrical connection, and by such growth can reach toward another copper conductor or electrical connection, eventually resulting in an electrical arc or short conducting through the tin whisker. Similarly, dust particle accumulation on surfaces of electrical equipment can provide shunting paths, and/or can constitute thermal insulation that adversely affects functionality. Metal whiskers, dust, and so forth are fine features: for example, while a tin whisker can have a length in excess of one centimeter, its diameter is typically on the order of a few microns. Hence, the spatial resolution of the visible light sensor 22 and of the corresponding visible light image or video 52 should be relatively high to provide sufficient resolution to detect these fine features. For example, in some embodiments, the visible light imaging sensor 22 has a spatial resolution of at least five million pixels. As one nonlimiting specific example, the visible light imaging sensor 22 may comprise 12 million pixels. These are merely nonlimiting illustrative examples.

In the case of acquisition of the infrared image or video 50 by the infrared imaging sensor 20, the image or video is capturing infrared light emitted by the electrical conductors, connections, and/or components of the electrical equipment due to heating of such conductors, connections, and/or components during operation of the electrical equipment. For example, a poor electrical connection undergoes resistive heating due to electrical conduction through the resistive connection, and this causes emission of heat in the form of infrared light that appears as a hot spot in the infrared image or video 50. As such, no applied illumination is required for the infrared imaging sensor 20 to acquire the infrared image or video 50. Hence, the illustrative endoscope 10 does not include an infrared LED or other infrared light source. Also, if the infrared imaging sensor 20 includes a suitable visible light blocking filter, then the infrared imaging sensor 20 is insensitive (or mostly insensitive) to visible light illumination.

On the other hand, acquisition of the visible light image or video 52 by the visible light imaging sensor 22 generally employs illumination applied by the at least one visible light source 24 and/or 26. For example, the endoscope 10 is often used to inspect electrical equipment that is housed within a housing or other enclosure that substantially blocks out any ambient visible light. The characteristics of the visible light image or video 52 thus depend not only on the characteristics (e.g. number of pixels) of the visible light imaging sensor 22, but also on the characteristics of the applied illumination. In this regard, it is recognized herein that green light is especially effective for detecting metal whiskers, dust, and other fine features. Green light exhibits strong scattering by metallic features such as metal whiskers, the human eye has highest sensitivity to green light when compared with other colors of visible light. Hence, in the illustrative embodiment of FIG. 3, the green light source 26 is used when acquiring the visible light image or video 52, and hence in FIG. 3 this is labeled as a green light image or video 52. In some embodiments, the green light source 26 is a green light emitting diode (LED) 26. This could be a single green LED or two or more such LEDs, and for brevity green LED 26 as used herein encompasses either a single LED or a cluster of two or more LEDs.

An advantage of using a green LED as the green light source 26 is a green LED produces relatively monochromatic green illumination light. For example, a typical commercially available green LED has a main peak in the green spectral range (that is, a light spectrum with a maximum intensity peak at a wavelength equal to or greater than 495 nanometers and less than or equal to 570 nanometers), with a full-width-at-half-maximum (FWHM) of 50 nm or less. Some commercial green LEDs designed for narrow spectrum have a FWHM of 10 nm or less. Using a green LED as the green light source 26 thus provides relatively monochromatic green light illumination which can promote detection of small features such as metal whiskers with narrow diameter on the order 1-5 microns by way of light scattering, reflection, and potentially also constructive and destructive optical interference of the narrowband green light. The user interface 54 of FIG. 3 further includes an optional "intensity" slider bar for the user to adjust the intensity of the green light illumination provided by the green light source 26, for example by controlling the driving current delivered to the green LED 26 via the electrical conductors 36 (which as shown in FIG. 3 also connect to the white and green light sources 24 and 26 so that they are powered by the electronic controller 40 via the cable or other connection 44 and electrical conductors 36).

While green light is disclosed herein as especially useful for detecting metal whiskers and other fine features during electrical equipment inspection for reasons stated above, it is alternatively contemplated to use illumination of a different color (e.g. orange light, red light, or so forth) or to use white light illumination for acquiring the visible light image or video 52. Furthermore, the illustrative embodiment of FIGS. 1-3 includes the white light source 24 in addition to the green light source 26. Providing the white light source 24 in addition to the green light source 26 can be useful, for example, to acquire the visible light image or video 52 using white light from the white light source 24 (option not shown in the user interface 54 of FIG. 3) for purposes of identifying specific components of the electrical equipment undergoing inspection so as to orient the user as to what is being imaged, before then switching to green light illumination from using the green light source 26 for detailed inspection to detect tin whiskers or the like. The initial orientation using white light can be beneficial as humans are typically more used to looking at white light images and hence may more quickly identify the overall components of the electrical equipment under inspection under white light illumination. However, it is also contemplated to omit the white light source 24 and include only the green light source 26 in the endoscope 10 (or, conversely, in yet other embodiments to omit the green light source 26 and include only the white light source 24, or a light source of a non-green color such as red, in the endoscope).

With continuing reference to FIG. 3, the illustrative example of FIG. 3 displays the infrared image or video 50 and the visible light image or video 52 simultaneously. In other embodiments, it is contemplated to display only one of these images at any given time. This latter approach allows the single displayed image to be displayed full-screen, i.e. with the image occupying the entire area of the display 42. In a hybrid approach, the user could be presented with a simultaneous display of both the infrared image or video 50 and the visible light image or video 52, with the user interface 54 providing the user with the functionality to select one of these images or video to display full-screen. For example, FIG. 3 presents full screen selection icons (box with arrows pointing to the upper left, upper right, lower left, and lower right). These full-screen selection icons are positioned in the illustrative user interface 54 at the upper right of each of the infrared image or video 50 and the visible light image or video 52, and if the user selects one of these icons (e.g. by touching it in the case of a touch-sensitive display) this results in the corresponding image being displayed full-screen in a full-screen display mode until the user subsequently selects an analogous icon or other use input that exits the full-screen display mode).

In the embodiment of FIG. 3, the white and green light sources 24 and 26 are powered by the electronic controller 40, which enables features such as automatic illumination dimming using the intensity slider shown in the user interface 54 of FIG. 3, or switching between white and green illumination via controls (not shown) of the user interface of the electronic controller 40. Providing this additional illumination control functionality entails some additional complexity in the user interface as well as additional electrical wires or the like in the bundle of electrical conductors 36.

Figure 4:
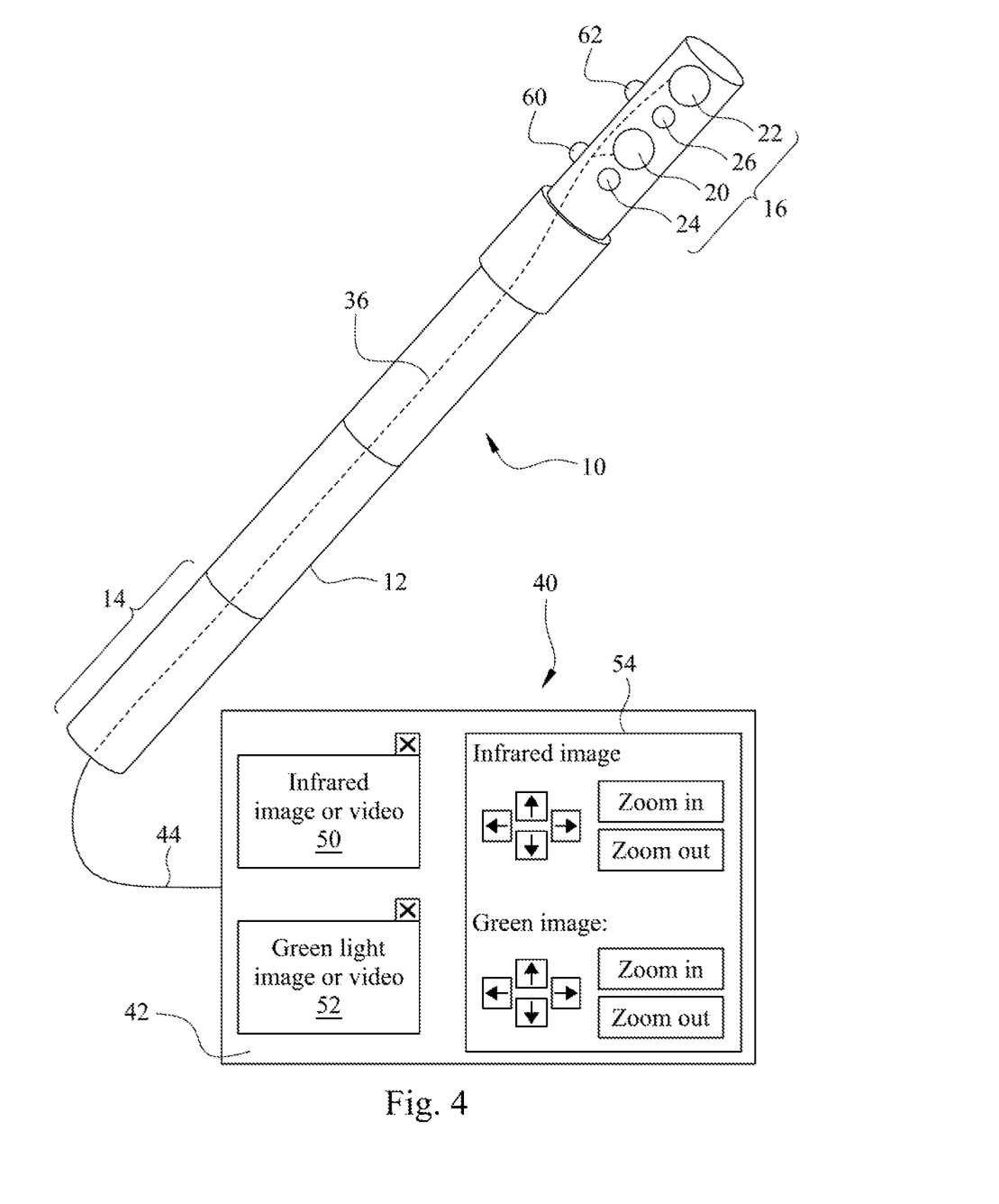
FIG. 4 diagrammatically illustrates an inspection system including an endoscope and an electronic controller with a display according to another embodiment.

With reference now to FIG. 4, a variant inspection system is shown, which again includes the endoscope 10 and the electronic controller 40. The components of the inspection system of FIG. 4 largely corresponding to corresponding components of the inspection system of FIG. 3, and are labeled with corresponding reference numbers and whose descriptions are not repeated for brevity. However, the variant inspection system of FIG. 4 differs from that of FIG.

3 in that in the embodiment of FIG. 4 the white and green LEDs 24 and 26 are not controlled by the electronic controller 40. Rather, the white LED 24 is operated by a corresponding on/off switch 60 disposed on the probe 16 of the endoscope 10, and similarly the green LED 26 is operated by a corresponding on/off switch 62 disposed on the probe 16 of the endoscope 10. These can, for example, be push-button on/off switches. To implement this approach, a battery or other power supply (not shown) may be incorporated into the probe 16 of the endoscope 10 to provide electrical power to drive the LEDs 24 and 26. As the LEDs 24 and 26 are not driven by the electronic controller 40 in the embodiment of FIG. 4, the electronic controller cannot adjust the illumination and hence the intensity slider shown in the user interface 54 of FIG. 3 is omitted in the user interface 54 of the variant embodiment of FIG. 4.

Figure 5:
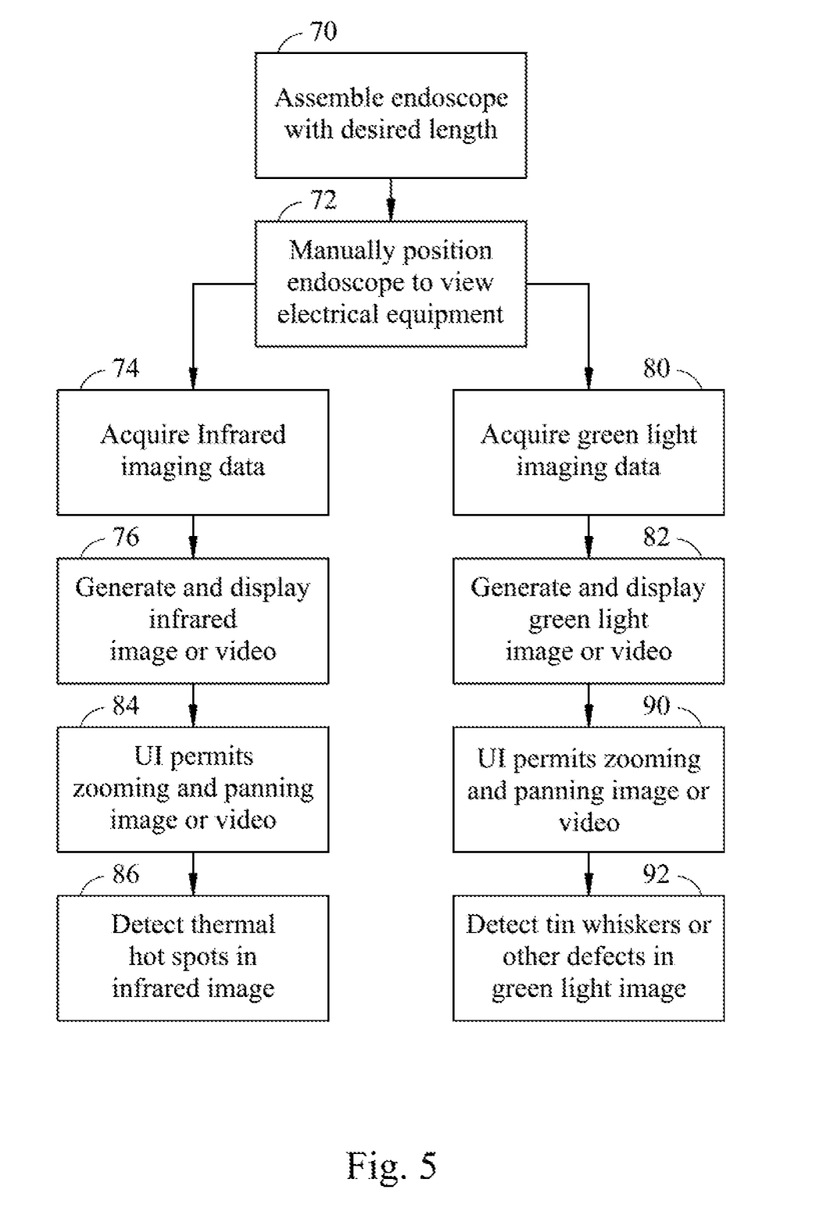
FIG. 5 illustrates a flowchart of an electrical equipment inspection process suitably performed using the inspection system of FIG. 3 or FIG. 4.

With reference now to FIG. 5, an inspection method is shown by way of a flowchart. The inspection method could for example be performed using the inspection system of FIG. 3 or the inspection system of FIG. 4. In an optional first operation 70, the endoscope 10 is assembled with the desired length for inspecting the electrical equipment to undergo inspection. The optional operation 70 could, for example, entail removing or attaching rod sections 31 and 32 to form a shorter rod 12 as shown in FIG. 2, or further attaching the further rod section 30 as shown in FIG. 3 to lengthen the rod 12. In some embodiments in which the rod 12 is modular, the various sections 30, 31, 32, the probe 16, and the connector 33 may be packaged as a kit in a suitable case (not shown) with recesses for these various parts, and the parts assembled at the time of inspection.

With the rod 12 (as-is if the rod is of fixed length, or after assembly according to operation 70 if the rod is modular), the user manually positions the endoscope 10 so that the imaging sensors 20 and 22 view the electrical equipment undergoing inspection.

In an operation 74, infrared imaging data are acquired, for example using the infrared imaging sensor 20 of the endoscope 10. In an operation 76, the infrared image or video 50 is generated from the infrared imaging data and displayed, e.g. on the display 42 of the electronic controller 40. The generation of the infrared image 50 may entail, for example, receiving the pixel values from the infrared imaging sensor 20 as a sequence of numbers forming the infrared imaging data and rendering the pixel values in a two-dimensional array to form the infrared image or video 50. Although not shown in FIG. 5, in the case of video the operations 74 and 76 are repeated at the frame rate to display video frames (i.e. images) at 30 frames per second or another chosen frame rate.

In similar fashion, in an operation 80, green light imaging data are acquired. In some embodiments, the operation 80 uses the white light imaging sensor 22 in combination with green light illumination provided by the green light source 26. In an operation 82, the green light image or video 52 is generated from the green light imaging data and displayed, e.g. on the display 42 of the electronic controller 40. The generation of the green light image 52 may entail, for example, receiving the pixel values from the white light imaging sensor 52 as a sequence of numbers forming the green light imaging data and rendering the pixel values in a two-dimensional array to form the green light image or video 52. Although not shown in FIG. 5, in the case of video the operations 80 and 82 are repeated at the frame rate to display video frames (i.e. images) at 30 frames per second or another chosen frame rate.

In some embodiments, the operations 74, 76, 80, and 82 are performed concurrently to acquire and display the infrared image 50 and the green light image 52 simultaneously. If this is the case, then the infrared imaging sensor 20 should include a white light blocking filter to block the green light illumination from reaching the photosensitive pixels of the infrared imaging sensor 20. Alternatively, the operations 74 and 76 can be performed at a different time than the operations 80 and 82. In this case, the blocking filter can optionally be omitted and the green light source 26 turned off during the operations 74 and 76. (typically, the white light source 24, if provided, will be off at least during the operations 74 and 80).

Figure 6:
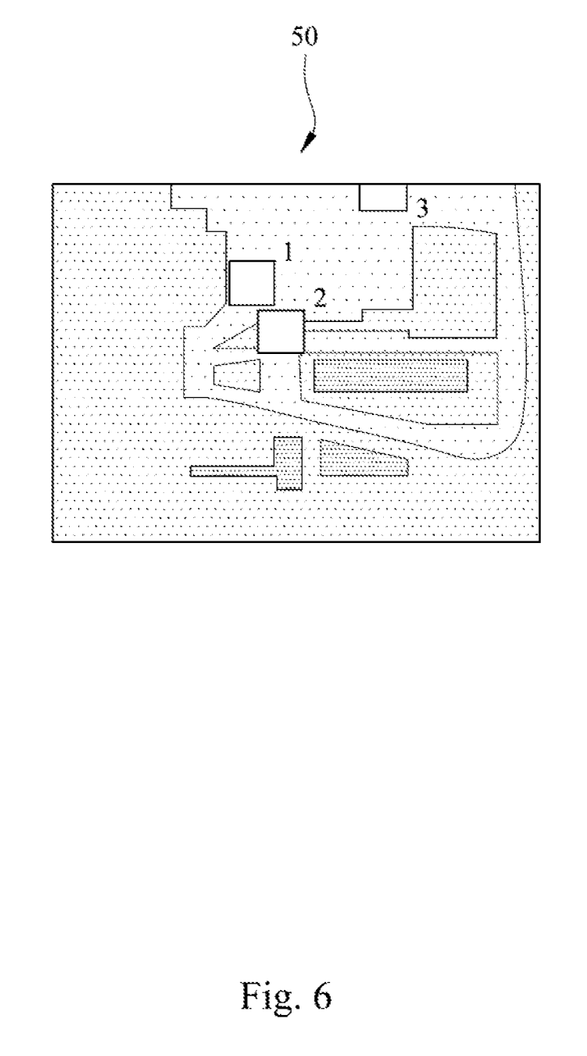
FIG. 6 diagrammatically shows an infrared image or video frame suitably acquired by the inspection system of FIG. 3 or FIG. 4, with three thermal hotspots detected.

With continuing reference to FIG. 5 and with further reference to FIG. 6, in an optional operation 84, the user interface (UI) 54 is used by a user to zoom, pan, or otherwise manipulate the infrared image or video 50 as desired to focus on a particular location of the imaged electrical equipment, and in an operation 86 thermal hot spots (if any) are detected in the infrared image or video 50. In one embodiment, the operation 86 is a manual operation, i.e. a human reviewer reviews the infrared image 50, optionally making use of the panning/zooming 84 to visually recognize any thermal hot spots as bright regions of the infrared image or video 50. FIG. 6 illustrates a rendering of a typical infrared image 50 with three thermal hot spots highlighted and labeled "1", "2", and "3". The user may annotate any identified thermal hot spots in the displayed infrared image or video 50, e.g. using the crosshairs and "1", "2" and "3" labels as shown in FIG. 6.

In a variant embodiment, an automated algorithm performed by the electronic controller 40 may automatically detect thermal hot spots in the infrared image or video 50. For example, the automated algorithm may determine a histogram of pixel intensity values for the infrared image (which may be a video frame in the case of video). Each bar of the histogram corresponds to an intensity range bin and each bar has a value corresponding to a count of the number of pixels whose intensity value falls in that intensity range bin. From the histogram, an average or other characteristic intensity value and the range of intensity values over the image may be determined. Using these values, a threshold intensity for detecting thermal hot spots is chosen, and then any region of the image whose intensity is above that threshold is flagged as a thermal hot spot. In other embodiments, a machine learning algorithm such as a convolutional neural network (CNN) can be trained to detect thermal hot spots using a corpus of training infrared images for which depicted thermal hot spots are labeled. The algorithm can automatically annotate any identified thermal hot spots in the displayed infrared image or video 50, e.g. using the crosshairs and "1", "2" and "3" labels as shown in FIG. 6.

Figure 7:
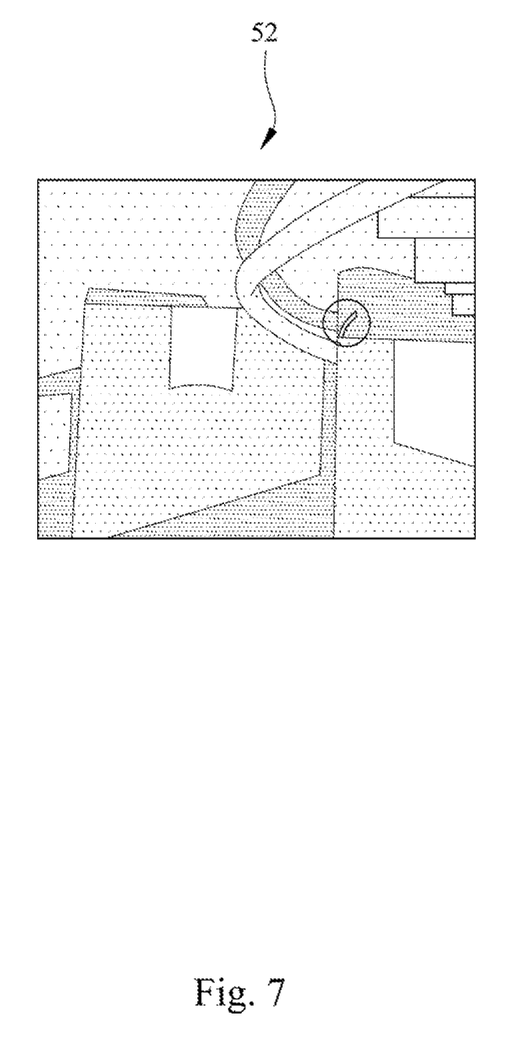
FIG. 7 diagrammatically shows a green light image or video frame suitably acquired by the inspection system of FIG. 3 or FIG. 4, with a tin whisker detected.
Figure 8:
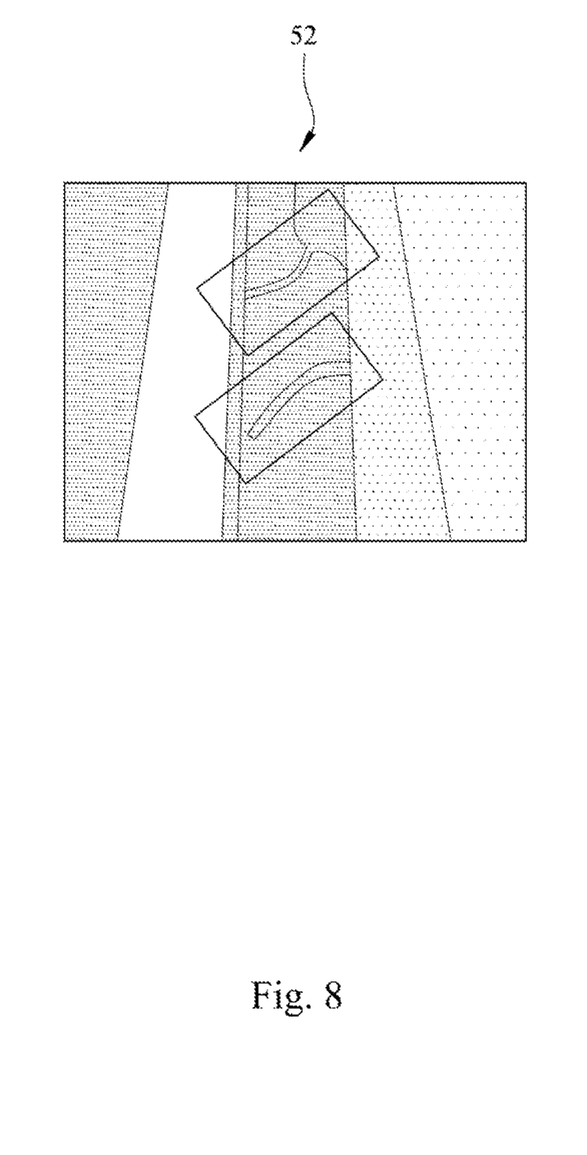
FIG. 8 diagrammatically shows a green light image or video frame suitably acquired by the inspection system of FIG. 3 or FIG. 4, with two tin whiskers detected.

With continuing reference to FIG. 5 and with further reference to FIGS. 7 and 8, in an optional operation 90, the user interface (UI) 54 is used by a user to zoom, pan, or otherwise manipulate the green light image or video 52 as desired to focus on a particular location of the imaged electrical equipment, and in an operation 92 tin whiskers or other defects (if any) are detected in the green light image or video 52. In one embodiment, the operation 92 is a manual operation, i.e. a human reviewer reviews the green light image or video 52, optionally making use of the panning/zooming 90 to visually recognize any tin whiskers or other defects in the green light image or video 52. FIGS. 7 and 8 illustrate renderings of two typical green light images 52. In the green light image 52 of FIG. 7, one tin whisker is observed as indicated by an annotated encircling circle. In the green light image 52 of FIG. 8, two tin whiskers are observed as indicated by corresponding annotated enclosing rectangles. To provide some sense of scale, the tin whiskers detected in the green light image 52 rendered in FIG. 8 have a length of 1.2 centimeters, which is considered a high risk for producing arcing, shunting, or other equipment degradation or failure. The user may annotate any identified tin whiskers in the displayed green light image or video 52, e.g. using the annotated circle of FIG. 7 or annotated rectangles of FIG. 8.

In a variant embodiment, an automated algorithm performed by the electronic controller 40 may automatically detect tin whiskers in the green light image or video 52. For example, matched filter techniques can be used to detect characteristic long thin features as tin whiskers, optionally after applying an edge enhancement filter to strengthen the image contrast of the tin whiskers. In other embodiments, a machine learning algorithm such as a CNN can be trained to detect tin whiskers using a corpus of training green light images for which depicted tin whiskers are labeled. The algorithm can automatically annotate any identified tin whiskers in the displayed green light image or video 52, e.g. using the annotated circle of FIG. 7 or annotated rectangles of FIG. 8 the annotated circle of FIG. 7 or annotated rectangles of FIG. 8.

While the operations 80, 82, 90, and 92 are described above as using green light images, more generally these operations could be performed in conjunction with illumination of another color, or in conjunction with white light illumination.

In the following, some further embodiments are described.

In a nonlimiting illustrative embodiment, an inspection apparatus is disclosed for performing electrical equipment inspection. The inspection apparatus includes a rod, a probe attached to a distal end of the rod, an infrared imaging sensor disposed on the probe, at least one visible light source disposed on the probe, and a visible light imaging sensor disposed on the probe. Electrical conductors pass through the rod from the probe at the distal end of the rod to a proximal portion of the rod opposite from the distal end of the rod. The electrical conductors are connected to transmit infrared imaging data acquired by the infrared imaging sensor to the proximal portion of the rod, and to transmit visible light imaging data acquired by the visible light imaging sensor to the proximal portion of the rod.

In a nonlimiting illustrative embodiment, an inspection method for electrical equipment inspection is disclosed. An infrared image or video of electrical equipment is acquired using an infrared imaging sensor. A green light image or video of the electrical equipment is acquired using a visible light imaging sensor and while illuminating the electrical equipment with green light illumination provided by a green light source. The infrared image or video of the electrical equipment is displayed on a display. The green light image or video of the electrical equipment is displayed on the display.

In a nonlimiting illustrative embodiment, an inspection apparatus s disclosed for performing electrical equipment inspection. The inspection apparatus includes a rod, a probe attached to a distal end of the rod, a green light source disposed on the probe and configured to emit green light, and a visible light imaging sensor disposed on the probe. An electronic controller is configured to acquire a green light image or video of the associated electrical equipment using the green light source and the visible light imaging sensor, and display the green light image or video on a display of the electronic controller.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An inspection apparatus for electrical equipment inspection, the inspection apparatus comprising:
   a rod;
   a probe attached to a distal end of the rod;
   an infrared imaging sensor disposed on the probe;
   at least one visible light source disposed on the probe;
   a visible light imaging sensor disposed on the probe;
   electrical conductors passing through the rod from the probe at the distal end of the rod to a proximal portion of the rod opposite from the distal end of the rod, the electrical conductors connected to transmit infrared imaging data acquired by the infrared imaging sensor to the proximal portion of the rod and to transmit visible light imaging data acquired by the visible light imaging sensor to the proximal portion of the rod; and
   an electronic controller having a display, the electronic controller operatively connected with the electrical conductors at the proximal portion of the rod to receive the infrared imaging data and the visible light imaging data, the electronic controller configured to display, on the display:
      an infrared image or video generated from the infrared imaging data,
      a visible light image or video generated from the visible light imaging data, and
      an annotation of a thermal hot spot in the infrared image or video.

2. The inspection apparatus of claim 1, wherein the at least one visible light source includes a green light source configured to emit green light.

3. The inspection apparatus of claim 2, wherein the green light has a light spectrum with a maximum intensity peak at a wavelength equal to or greater than 495 nanometers and less than or equal to 570 nanometers.

4. The inspection apparatus of claim 2, wherein the at least one visible light source further includes a white light source configured to emit white light.

5. The inspection apparatus of claim 1, wherein the display of the electronic controller is a touch-sensitive display enabling zooming and panning of the infrared image or video and zooming and panning of the visible light image or video.

6. The inspection apparatus of claim 1, wherein:
   the at least one visible light source includes a green light source configured to emit green light;
   the electrical conductors are further configured to deliver operative electrical power from the proximal portion of the rod to the green light source;
   the electronic controller is further configured to acquire the visible light imaging data as green light imaging data illuminated by green light from the green light source and to display the visible light image or video comprising a green light image or video generated from the green light imaging data; and the electronic controller is further configured to display an annotation on the display of a tin whisker in the green light image or video.

7. The inspection apparatus of claim 6, wherein the electronic controller is further configured to:

detect the metal whisker in the green light image or video.

8. The inspection apparatus of claim 1, wherein the visible light imaging sensor has a spatial resolution of at least 5 million pixels and the infrared imaging sensor has a spatial resolution of one million pixels or lower.

9. An inspection method for electrical equipment inspection, the inspection method comprising:

acquiring an infrared image or video of electrical equipment using an infrared imaging sensor;

acquiring a green light image or video of the electrical equipment using a visible light imaging sensor and while illuminating the electrical equipment with green light illumination provided by a green light source;

displaying the infrared image or video of the electrical equipment on a display;

displaying the green light image or video of the electrical equipment on the display; and displaying an annotation on the display of a tin whisker in the green light image or video.

10. The inspection method of claim 9, wherein the green light illumination has a light spectrum with a maximum intensity peak at a wavelength equal to or greater than 495 nanometers and less than or equal to 570 nanometers.

11. The inspection method of claim 9, wherein the visible light image or video of the electrical equipment has a spatial resolution of at least 5 million pixels and the infrared image or video of the electrical equipment has a spatial resolution of one million pixels or lower.

12. The inspection method of claim 9, wherein the infrared image or video of the electrical equipment and the green light image or video of the electrical equipment are displayed on a touch-sensitive display enabling zooming and panning of the infrared image or video of the electrical equipment and zooming and panning of the visible light image or video of the electrical equipment.

13. The inspection method of claim 9, wherein the infrared imaging sensor, the visible light imaging sensor, and the green light source are disposed on a probe attached to a distal end of a rod.

14. An inspection apparatus for electrical equipment inspection, the inspection apparatus comprising:

a rod;

a probe attached to a distal end of the rod;

a green light source disposed on the probe and configured to emit green light;

a visible light imaging sensor disposed on the probe; and an electronic controller configured to:

acquire a green light image or video of the associated electrical equipment using the green light source and the visible light imaging sensor;

display the green light image or video on a display of the electronic controller; and detect a metal whisker in the green light image or video and annotate the detected metal whisker in the displayed green light image or video.

15. The inspection apparatus of claim 14, wherein the green light has a light spectrum with a maximum intensity peak at a wavelength equal to or greater than 495 nanometers and less than or equal to 570 nanometers.

16. The inspection apparatus of claim 14, further comprising:

a white light source disposed on the probe and configured to emit white light.

17. The inspection apparatus of claim 14, wherein the display of the electronic controller is a touch-sensitive display enabling zooming and panning of the infrared image or video and zooming and panning of the green light image or video.

18. The inspection apparatus of claim 14, further comprising:

an infrared imaging sensor disposed on the probe;

wherein the electronic controller is further configured to acquire an infrared image or video of associated electrical equipment using the infrared imaging sensor and to display the infrared image or video on the display of the electronic controller.

19. The inspection apparatus of claim 1, wherein the electronic controller is further configured to detect the thermal hot spot in the infrared image or video.

20. The inspection method of claim 9, further comprising displaying an annotation on the display of a thermal hot spot in the infrared image or video.

* * * * *